United States Patent
Nakamura

[11] Patent Number: 5,867,311
[45] Date of Patent: Feb. 2, 1999

[54] ILLUMINATION STRUCTURE IN MICROSCOPE

[75] Inventor: Katsushige Nakamura, Tokyo, Japan

[73] Assignee: Mitaka Kohki Co., Ltd., Tokyo, Japan

[21] Appl. No.: 805,725

[22] Filed: Feb. 25, 1997

[30] Foreign Application Priority Data

Mar. 1, 1996 [JP] Japan .................................. 8-044818

[51] Int. Cl.$^6$ ........................................................ G02B 2/06
[52] U.S. Cl. ............................ 359/389; 359/385; 359/388
[58] Field of Search ................................. 359/368–369, 359/380–384, 385–390, 477, 601, 611, 614; 351/213, 221, 216–218, 233–234, 243

[56] References Cited

U.S. PATENT DOCUMENTS

| | | | |
|---|---|---|---|
| 4,127,318 | 11/1978 | Determann et al. | 359/385 |
| 4,614,411 | 9/1986 | Horenz et al. | 359/388 |
| 4,657,013 | 4/1987 | Hoerenz et al. | 359/385 |
| 4,657,357 | 4/1987 | Nishimura et al. | 359/389 |
| 4,783,159 | 11/1988 | Takagi et al. | 359/385 |
| 4,991,947 | 2/1991 | Sander et al. | 359/389 |
| 5,126,877 | 6/1992 | Biber | 359/385 |
| 5,298,969 | 3/1994 | Cheung | 356/343 |
| 5,446,582 | 8/1995 | Takagi et al. | 359/385 |

FOREIGN PATENT DOCUMENTS

| | | | |
|---|---|---|---|
| 0 509 856 | 10/1992 | European Pat. Off. . | |
| 29 32 486 | 2/1981 | Germany . | |
| 226668 | 8/1985 | Germany | 359/385 |
| 4214445 | 4/1993 | Germany | 359/385 |

*Primary Examiner*—Thong Nguyen
*Attorney, Agent, or Firm*—Michael D. Bednarek; Kilpatrick Stockton LLP

[57] ABSTRACT

In a microscope having one or more separate lenses 11a to 11d arranged in side-by-side relationship within an area equal to or smaller than that of an objective lens for guiding separate beams of viewing light L respectively, the separate lenses 11a to 11d are located off the optical axis S which extends across the center of the objective lens, and a single illumination input 13 is provided across the optical axis S for directing an illumination light R along the optical axis S through the objective lens to a target area to be viewed.

6 Claims, 7 Drawing Sheets

ILLUMINATION STRUCTURE IN MICROSCOPE

BACKGROUND OF THE INVENTION

1. Field of the Invention

The present invention relates to an illumination structure in a microscope.

2. Prior Art

In a common optical system of a microscope, a light flux reflected from a target area to be viewed is guided through an objective lens and a set of different lenses to an eyepiece for having an enlarged view of the target area.

FIG. 8 shows one of such known optical systems (which is disclosed in German Patent Application laid open under No. 2932486), in which a pair of objective lenses 20 and 21 are provided; the lower 20 is fixed and the upper 21 is vertically movable. Upward and downward movements of the upper objective lens 21 varies the focal length of the optical system. The upper objective lens 21 has a slit 23 provided therein for accepting a light shielding sheet 24. While the light shielding sheet 24 is anchored to a prism P, it allows the upper objective lens 21 to vertically move along.

A flux of viewing light L is returned along the center axis of the two objective lenses 20 and 21. An illumination light R is projected through the prism P along a tilted path separated by the light shielding sheet 24. Since the path of the illumination light R is separated by the light shielding sheet 24, no straying portion of the illumination light R will interfere the viewing light L.

However, the illumination light R in the conventional microscope is projected at an angle to and off the center axis of the objective lenses 20 and 21 thus creating shadows on the target area or if the target area is deep and narrow, hardly reaching the lowermost of the target area.

It is recently required for allowing more than one person to view the target area simultaneously or recording the target area with a video camera or the like while viewing it to guide and distribute the viewing light L as a group of separate beams through their respective lenses. As shown in FIG. 8, the objective lenses 20 and 21 are limited in use since their specific region defined by the light shielding sheet 24 is used for passing the illumination light R, and allow the viewing light L to pass across the remaining region. Hence, a desired number of separate beams of the viewing light L will hardly be obtained.

The present invention has been developed in view of such a prior art and its object is to provide an illumination structure in a microscope capable of illuminating the lowermost of a deep, narrow target area to be viewed and distributing the viewing light as a desired number of separate beams with ease.

SUMMARY OF THE INVENTION

For achievement of the above object, the present invention provides a microscope which has one or more separate lenses arranged in side-by-side relationship within an area equal to or smaller than that of an objective lens for guiding separate beams of viewing light, in which microscope the separate lenses are located off the optical axis which extends across the center of the objective lens, and a single illumination input is provided across the optical axis for directing an illumination light along the optical axis through the objective lens to a target area to be viewed.

According to the present invention, the illumination light is introduced along the optical axis of the objective lens from the illumination input provided across the optical axis and hence projected straightly to the target area to be viewed. This allows the illumination light to develop no shadow on the target area and to reach the lowermost of the target area which may be deep and narrow. Also, while the illumination light is projected through the center of the objective lens, the region other than the center of the objective lens is used for passing the viewing light as a desired number of separate beams.

An illumination structure in a microscope having two or more separate lenses arranged in side-by-side relationship within an area equal to or smaller than that of an objective lens for guiding separate beams of viewing light respectively, according to another feature of the present invention, is characterized by one or more illumination inputs provided between the adjacent separate lenses so that a desired number of illumination lights are passed through the objective lens to a target area to be viewed while running close to the optical axis.

Since the illumination inputs are located between the adjacent separate lenses in the area of the objective lens, the respective illumination lights are directed closely along the optical axis. This will hardly develop any shadow on the target area to be viewed and allow the illumination lights to reach the lowermost of the target area which may be deep and narrow. Also, the viewing light can be obtained as a desired number of separate beams in the same manner as of the preceding illumination structure.

The illumination structure in a microscope may further comprise one or more additional lenses mounted across the optical axis of the objective lens. These additional lenses have a through aperture provided therein in relation to the illumination input, and a light-shielding tube is fitted into the through apertures of the additional lenses.

According to a further feature of the present invention, the light-shielding tube is mounted in the through apertures of the additional lenses arranged in relation to the illumination input while the additional lenses are aligned on the optical axis. Hence, when the illumination light of high intensity is introduced into the through aperture, the light will rarely interfere the separate beams of the viewing light.

The illumination structure in a microscope may be modified in which the light-shielding tube is fixedly joined to the objective lens and contains condenser lenses for focusing the illumination light, and is arranged to move together with the condenser lenses and the objective lens along the optical axis.

According to a still further feature of the present invention, the light-shielding tube containing the condenser lenses is movable together with the objective lens thus allowing the illumination light to be concentrically focused on the target area to be viewed.

The illumination structure in a microscope may be modified in which the illumination input is formed substantially round.

According to a still further feature of the present invention, the substantially round illumination input will be readily formed.

The illumination structure in a microscope may be modified in which the illumination input is formed substantially elliptic.

According to a still further feature of the present invention, the substantially elliptic illumination input can be arranged in a minimum space between any adjacent separate lenses.

The present invention is not limited to the above embodiments and its other objects, features, and advantages will be apparent from the following detailed description in conjunction with the relevant drawings. It is also understood that various changes and modifications not departing from the spirit of the prevent invention will be covered by the scope of the present invention.

PREFERRED EMBODIMENTS

Figure 1:
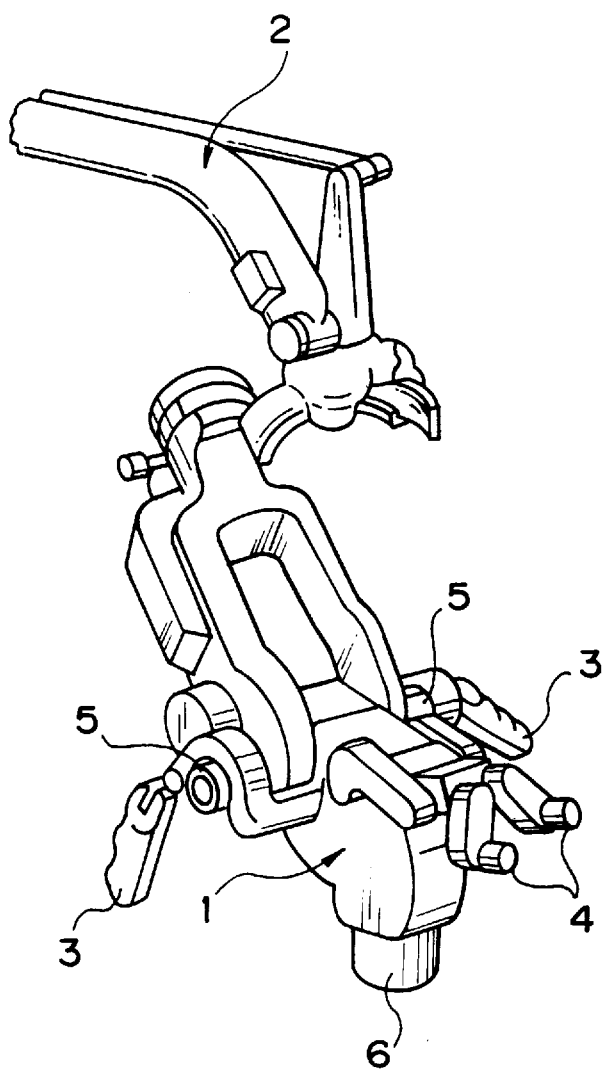
FIG. 1 is a perspective view of a microscope showing a first embodiment of the present invention.

Preferred embodiments of the present invention will be described referring to the accompanying drawings.

FIGS. 1 to 4 illustrate a first embodiment of the present invention, in which a microscope 1 is designed for use in operations of medical treatment and commonly used in an over-hanging state as mounted to the distal end of a stand apparatus 2 for exclusive use. The microscope 1 can be moved to a desired spatial position by a doctor manipulating a handle 3. During a brain or cardinal surgery operation, a target part of the human body is treated while having enlarged view through the microscope 1.

The microscope 1 has two pairs of binocular eyepieces, a main pair 4 at one end and the other, not shown, at an opposite side, and two optical outputs 5 mounted to both, left and right, sides of the microscope for receiving images of the target area. A side microscope for the use of an assistant and a video camera for recording the images may be attached to the optical output 5.

A lens tube 6 is mounted to the bottom of the microscope 1. The lens tube 6 contains an objective lens 7 therein which is moved upward and downward for focusing, and a group of lenses 8 and 9 located above the objective lens 7. The group lenses 8 and 9 serve optically as parts of the objective lens so that the distance between the objective lens 7 and the group lenses 8 and 9 can be varied for controlling a focal length.

Figure 2:
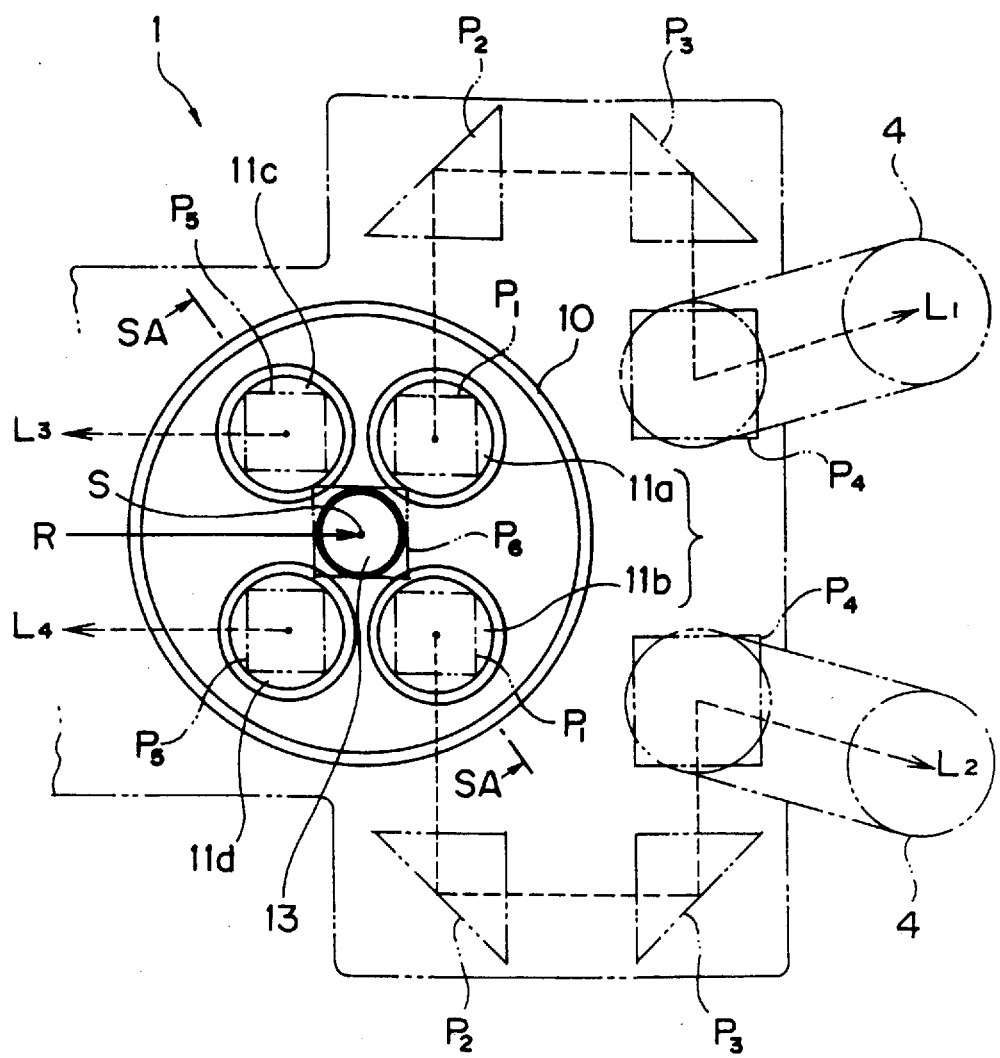
FIG. 2 is a plan view of a main optical system at an eyepiece side in the microscope.
Figure 3:
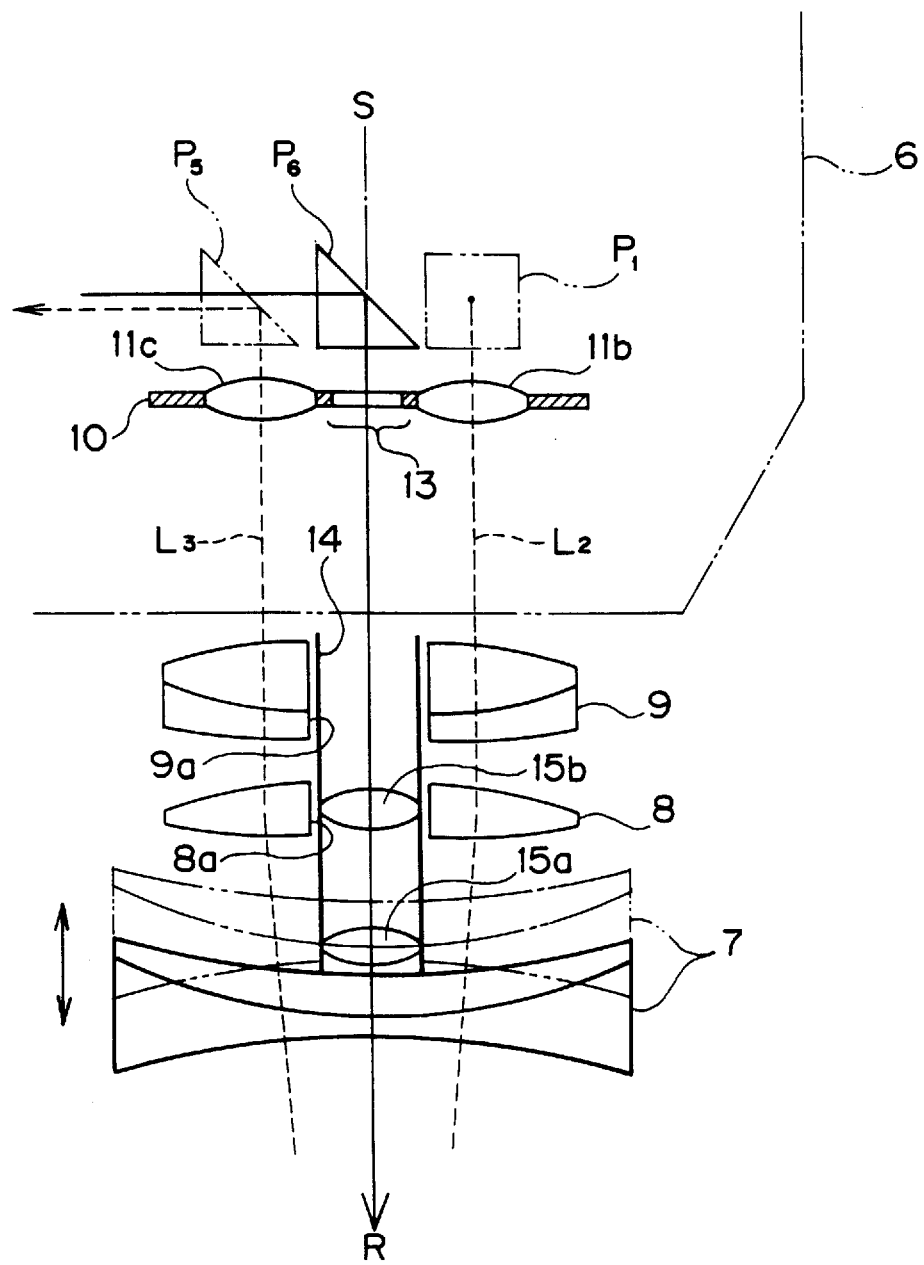
FIG. 3 is a cross sectional view taken along the line SA—SA of FIG. 2.

As shown in FIG. 2, a lens-fitting plate 10 of a disk shape is mounted above the objective lens 7 and the group lenses 8 and 9. The lens-fitting plate 10 has four separate lenses 11a to 11d mounted thereon in side-by-side relationship. The four separate lenses 11a to 11d pass beams of viewing light introduced from the target area and separate into four separate beams $L_1$ to $L_4$ respectively which are then directed to the eyepieces 4.

For example, two separate beams $L_1$ and $L_2$ of viewing light from their respective lenses 11a and 11b of the lens-fitting plate 10 are reflected through prisms $P_1$ to $P_4$ to the eyepieces 4. The two other separate beams $L_3$ and $L_4$ from their respective lenses 11c and 11d are reflected by prisms $P_5$ in the opposite direction and enter the other eyepieces (not shown). Simultaneously, some of the separate beams $L_3$ and $L_4$ are branched into right and left by beam splitters (not shown) and directed to the optical output 5. The prisms $P_1$ to $P_5$ are not limitative and may be substituted by any appropriate optical device. It is also possible to add a zoom lens or the like to the downstream of the separate lenses 11a to 11d at option.

The lens-fitting plate 10 on which the four separate lenses 11a to 11d are fixedly mounted has in the center thereof a round illumination input 13 provided across which the optical axis S of the objective lens 7 extends. A prism $P_6$ is mounted above the illumination input 13 for directing an illumination light R to the illumination input 13. The group lenses 8 and 9 have therein through apertures 8a and 9a of substantially an identical round provided for corresponding to the illumination input 13. A light-shielding tube 14 is fitted into the through apertures 8a and 9a and anchored at the lower end to the objective lens 7. The light-shielding tube 14 is made of a cylindrical metallic material painted in black for shielding the illumination light. A pair of condenser lenses 15a and 15b are mounted in the light-shielding tube 14. The light-shielding tube 14 and the two condenser lenses 15a and 15b can vertically be moved together with the objective lens 7. In this embodiment, the illumination input 13, the through apertures 8a and 9a, and the opening of the light-shielding tube 14 are all simply round so as to be easily shaped.

Figure 4:
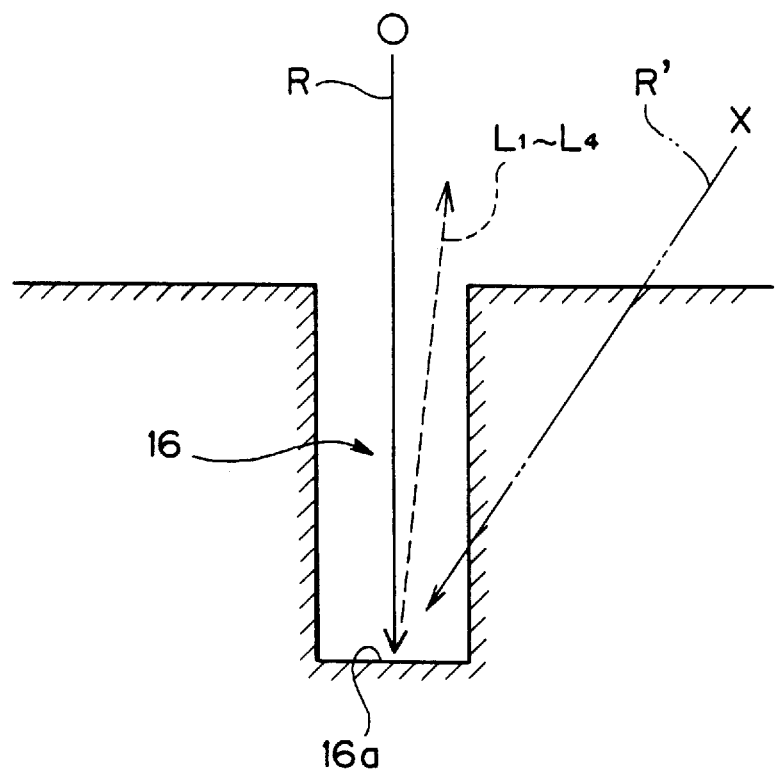
FIG. 4 is a side view of a target area to be viewed which is deep and narrow.

The illuminating action in the first embodiment will now be explained in case that a target area 16 to be viewed is deep and narrow as shown in FIG. 4. Being introduced from the illumination input 13 is directed along the optical axis S of the objective lens 7 to the target area 16, the illumination light R falls straightly from above on the target area 16. This allows the deep and narrow target area 16 to be illuminated to its bottom 16a. Any conventional illumination light R' is however incident on the target area 16 at an angle as denoted by the imaginary line in FIG. 4 and will hardly reach the bottom 16a of the target area 16 hence image observed will be dim and obscure.

Since the light-shielding tube 14 is fitted into the through apertures 8 and 9 where the illumination light R runs, it prevents the illumination light R from escaping as a stray light or interfering the separate beams $L_1$ to $L_4$ of viewing light reflected from the target area 16, even if the intensity of the illumination light R is increased. Also, the vertical movement of the light-shielding tube 14 and the two condenser lenses 15a and 15b together with the objective lens 7 allows the condenser lenses 15a and 15b in the light-shielding tube 14 to concentrically focus the illumination light R on the bottom 16a of the target area 16.

Although the separate lenses are installed four 11a to 11d in the first embodiment, they may be one, two, three, five, or more.

Figure 5:
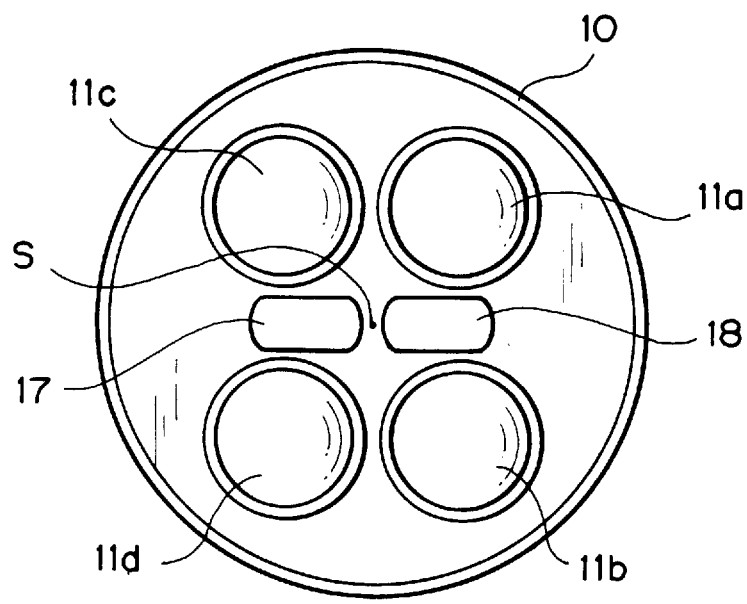
FIG. 5 is a plan view showing a second embodiment of the present invention.

FIG. 5 illustrates a second embodiment of the present invention, in which a couple of illumination inputs 17 and 18 are provided between two left-to-right adjacent pairs of the four separate lenses 11a to 11d respectively. The two illumination inputs 17 and 18 are not aligned with but located very close to the optical axis S. As the illumination light R runs very close to the optical axis S, the same effect as of the first embodiment will be obtained. The illumination inputs 17 and 18 are flat and elliptic so that they can be provided in relatively small spaces between the two left-to-right adjacent pairs of the four separate lenses 11a to 11d.

Although the separate lenses are installed four 11a to 11d in the second embodiment, they may be one, two, three, five, or more. Also, the illumination inputs are not limited to two 17 and 18 but may be one, three, or more in view of the number of the separate lenses.

Figure 6:
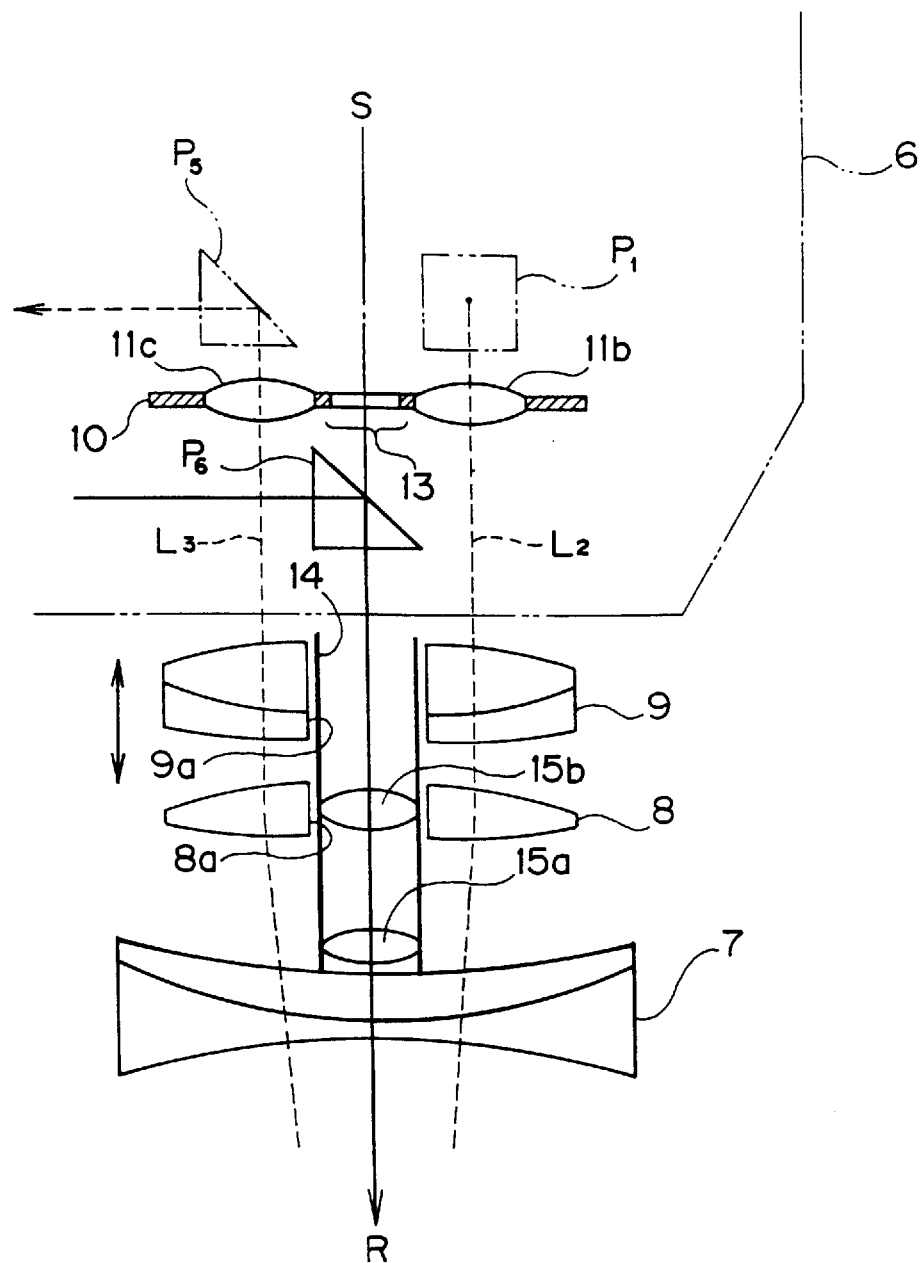
FIG. 6 is a cross sectional view, similar to FIG. 3, showing a third embodiment of the present invention.

FIG. 6 shows a third embodiment of the present invention, in which the prism $P_6$ is located beneath the illumination input 13. For focusing the target area, the two lenses 8 and 9 are vertically moved in place of the objective lens 7. The focusing movement of the two lenses 8 and 9 is implemented by a simple mechanism and thus advantageous in the cost while provides the same effect as of the previous embodiments.

Figure 7:
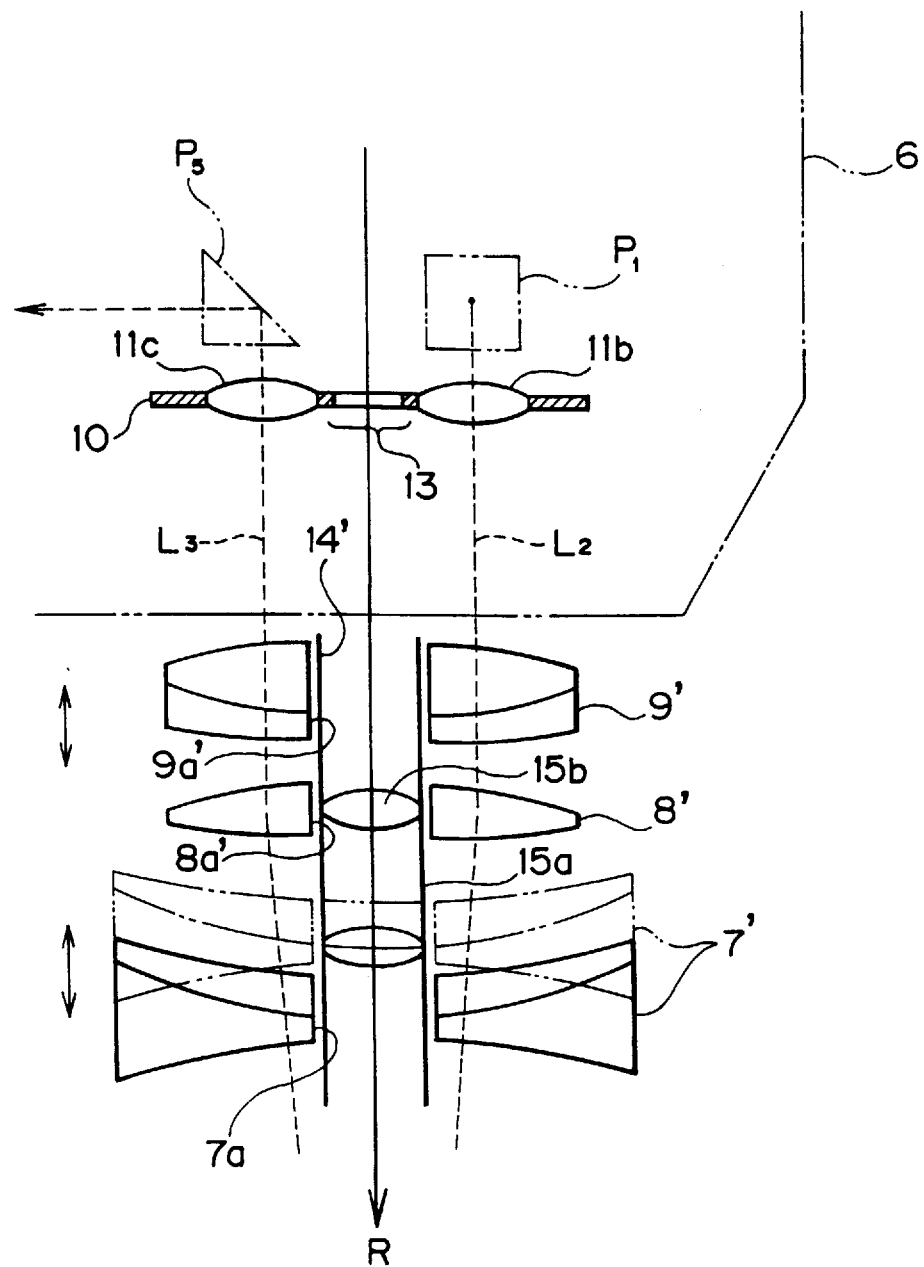
FIG. 7 is a cross sectional view, similar to FIG. 3, showing a fourth embodiment of the present invention.
Figure 8:
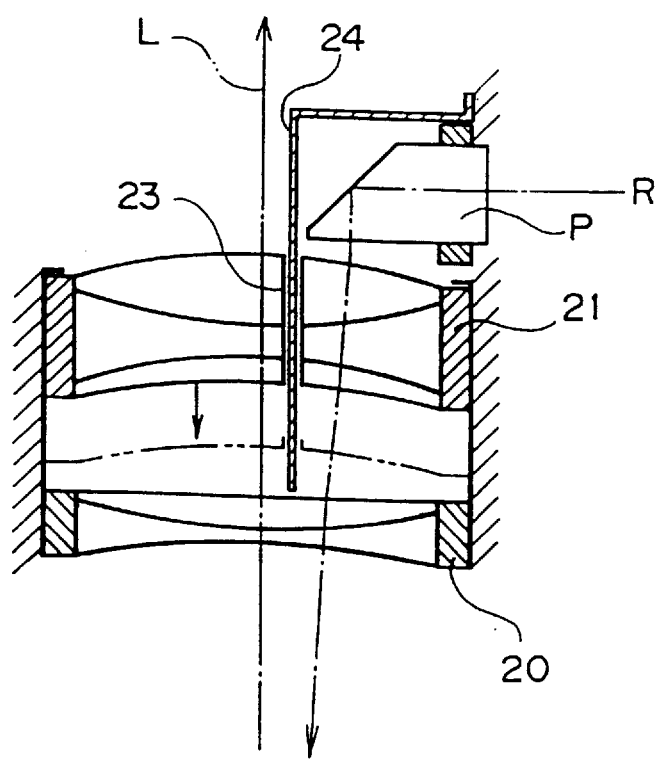
FIG. 8 is a cross sectional view of an optical system in a conventional microscope.

FIG. 7 illustrates a fourth embodiment of the present invention, in which the prism $P_6$ is eliminated and the illumination light R is directly projected from above. Also, a light-shielding tube 14' is fitted into a pair of through apertures 8a' and 9a' of their respective lenses 8' and 9' and extended at its lower end through a through aperture 7a provided in an objective lens 7'. For focusing, the objective lens 7' or the two lenses 8' and 9' together with the light-shielding tube 14' may vertically be moved.

What is claimed is:

1. An illumination structure in a microscope, said microscope comprising: an objective lens having a center and a predetermined lens area; a plurality of separate lenses arranged in side-by-side relationship within an area equal to or smaller than that of the objective lens for guiding separate beams of viewing light respectively, wherein said separate lenses are located off an optical axis that extends across the center of said objective lens;

a single illumination input is provided coincident with the optical axis for directing an illumination light along the optical axis through the objective lens to a target area to be viewed; and a plurality of additional lenses mounted across the optical axis, each additional lens having a through aperture provided therein in relation to the illumination input; and a light-shielding tube fitted into the through apertures of the additional lenses.

2. An illumination structure in a microscope according to claim 1, wherein the light-shielding tube is fixedly joined to the objective lens and contains condenser lenses for focusing the illumination light, and is arranged to move together with the condenser lenses and the objective lens along the optical axis.

3. An illumination structure in a microscope according to claim 1, wherein the illumination input is formed substantially round.

4. An illumination structure in a microscope according to claim 1, wherein the illumination input is formed substantially elliptic.

5. An illumination structure in a microscope, said microscope comprising: a plurality of separate lenses arranged in side-by-side relationship within an area equal to or smaller than that of an objective lens for guiding separate beams of viewing light respectively, wherein said separate lenses are located off an optical axis which extends across a center of said objective lens;

a single illumination input is provided parallel with the optical axis for directing an illumination light along the optical axis through the objective lens to a target area to be viewed; and further comprising a plurality of additional lenses mounted across the optical axis, each additional lens having a through aperture provided therein in relation to the illumination input; and a light-shielding tube fitted into the through apertures of the additional lenses.

6. An illumination structure according to claim 5, wherein the light-shielding tube is fixedly joined to the objective lens and contains condenser lenses for focusing the illumination light, and is arranged to move together with the condenser lenses and the objective lens along the optical axis.

* * * * *